United States Patent
Rosiglioni

(10) Patent No.: US 8,093,735 B1
(45) Date of Patent: Jan. 10, 2012

(54) SEA WAVE ELECTRICAL POWER GENERATION SYSTEM

(76) Inventor: Armando Rosiglioni, Metairie, LA (US)

( * ) Notice: Subject to any disclaimer, the term of this patent is extended or adjusted under 35 U.S.C. 154(b) by 1222 days.

(21) Appl. No.: 11/757,363

(22) Filed: Jun. 2, 2007

(51) Int. Cl.
F03B 13/10 (2006.01)
F03B 13/12 (2006.01)
H02P 9/04 (2006.01)

(52) U.S. Cl. .......................... 290/42; 290/53
(58) Field of Classification Search .................. 290/42, 290/43, 53, 54; 60/495, 496, 497, 498, 500, 60/501, 504, 698, 398, 505, 507; 417/330, 417/332, 331
See application file for complete search history.

(56) References Cited

U.S. PATENT DOCUMENTS

| | | | | |
|---|---|---|---|---|
| 434,916 A * | 8/1890 | Chaffey | ...................... | 417/332 |
| 3,030,893 A * | 4/1962 | Shaffer | ...................... | 417/331 |
| 3,487,228 A * | 12/1969 | Kriegel | ...................... | 290/52 |
| 4,177,643 A * | 12/1979 | Lorphelin | ...................... | 60/496 |
| 4,207,741 A * | 6/1980 | Rainey | ...................... | 60/496 |
| 4,560,884 A * | 12/1985 | Whittecar | ...................... | 290/42 |
| 4,598,211 A * | 7/1986 | Koruthu | ...................... | 290/53 |
| 4,931,662 A * | 6/1990 | Burton | ...................... | 290/42 |
| 5,708,305 A * | 1/1998 | Wolfe | ...................... | 290/53 |
| 6,282,908 B1 * | 9/2001 | Weldon | ...................... | 62/6 |
| 6,711,897 B2 * | 3/2004 | Lee | ...................... | 60/507 |
| 7,694,513 B2 * | 4/2010 | Steenstrup et al. | ...................... | 60/498 |
| 2008/0000224 A1 * | 1/2008 | Swart | ...................... | 60/497 |

FOREIGN PATENT DOCUMENTS

JP 56113059 A * 9/1981

* cited by examiner

Primary Examiner — Julio C. Gonzalez
(74) Attorney, Agent, or Firm — Kenneth L Tolar

(57) ABSTRACT

A power generation system that converts energy associated with ocean waves into electrical energy includes a plurality of floats positioned on a body of water. Each float includes an actuator arm that, when reciprocated, drives an oil piston positioned within an oil chamber. Each piston pumps oil into a supply header that fills a load cylinder with pressurized oil. Each load cylinder includes a weighted member superimposed on a plunger that is lifted by the pressurized oil; automated control valves release the oil causing the weighted member to fall rapidly. A geared rack at a lower end of the plunger engages a pinion that drives a generator. Accordingly, the rapid descent of the heavy member drives the pinion and thus the generator thereby producing electrical power.

27 Claims, 9 Drawing Sheets

SEA WAVE ELECTRICAL POWER GENERATION SYSTEM

CROSS REFERENCE TO RELATED APPLICATIONS

None.

BACKGROUND OF THE INVENTION

The present invention relates to a system for generating electrical power from the kinetic and potential energy associated with sea waves.

DESCRIPTION OF THE PRIOR ART

Sea waves contain a substantial amount of both kinetic and potential energy that is rarely used. Furthermore, the cost of electrical power generation continues to soar contemporaneously with the price of the various fossil fuels which are typically used to generate electrical power, such as natural gas and oil. Nuclear power plants are often considered a less expensive alternative to conventional power generation plants; however, certain localities often consider the risk of a catastrophic event to be far too great to justify any potential cost savings. Furthermore, both conventional and nuclear power generating plants discharge numerous harmful substances to the environment.

Finally, conventional hydrogen production facilities consume significant amounts of the conventional energy sources described above. However, when hydrogen is used as a combustion source, atmospheric oxygen is consumed. Water electrolysis is an alternative means of producing hydrogen and oxygen from water, but it is typically too costly in terms of fuel source consumption to justify its use. However, if electrical power for the electrolysis process could be generated from an alternative, more affordable and environmentally friendly source, not only would hydrogen production from water electrolysis be feasible, it also would produce excess oxygen, which could be released to the atmosphere to replace any oxygen degradation caused by hydrogen combustion. Therefore, hydrogen production from electrolysis and its subsequent use as a fuel source would be far more appealing. For all of the foregoing reasons, there is currently a need for a safer, more efficient and environmentally friendlier means of generating electrical power. The present invention addresses this need by providing a uniquely designed power generation system that converts energy from sea waves into electrical power.

SUMMARY OF THE INVENTION

A power generation system that converts energy associated with water waves into electrical energy includes a plurality of floats positioned on a body of water. Each float includes an actuator arm that, when reciprocated, drives an oil piston positioned within an oil chamber. Each piston pumps oil into a supply header that fills a load cylinder with pressurized oil. Each load cylinder includes a weighted member superimposed on a plunger that is lifted by the pressurized oil; automated valves release the oil causing the weighted member to fall rapidly. A geared rack at a lower end of the plunger engages a pinion that drives a generator. Accordingly, the rapid downward movement of the weighted member drives the pinion, and thus the generator, thereby producing electrical power.

It is therefore an object of the present invention to provide a power generation system that is environmentally friendly.

It is another object of the present invention to provide a power generation system that converts energy associated with sea waves into electrical energy.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 9:
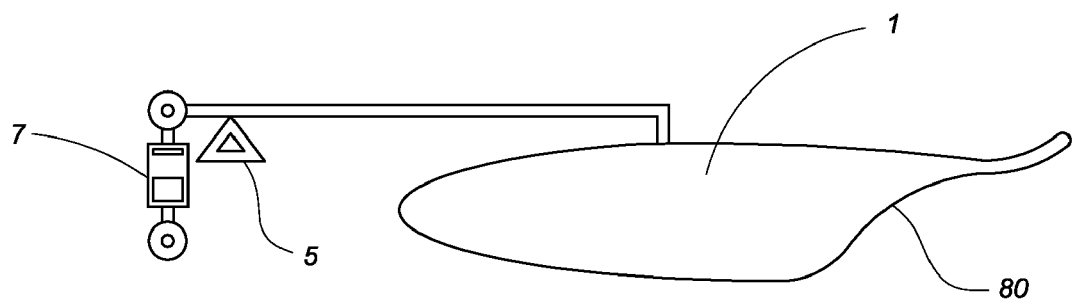
FIG. 9 depicts a typical float configuration.
Figure 10:
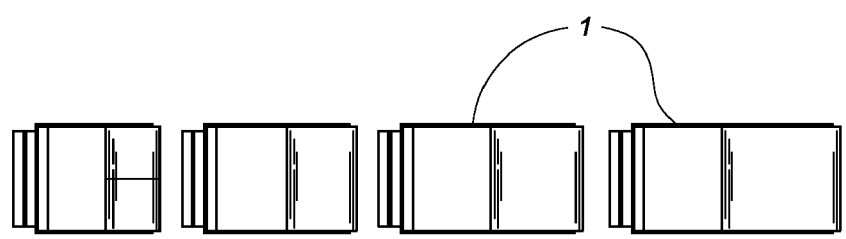
FIG. 10 depicts a series of aligned floats decreasing in size according to their relative positions along a wave vector.

The present invention relates to an electrical power generation system. The system includes one or more floats 1 resting on the surface of an ocean, sea, gulf or other large body of water 2 where wave action is generally significant and continuous. Now referring specifically referring to FIGS. 9 and 10, each float preferably includes an inwardly tapered end 80 that faces oncoming waves to maximize the energy transfer efficiency from the wave to the floater. Additionally, if multiple floats are aligned in series, the overall dimension of each float sequentially decreases along a vector that is parallel to the direction of the waves. Because a given wave will initially contain more energy when impacting a first float within a series, it will be capable of reciprocating a larger float. As a wave impacts succeeding floats, it will contain less energy thereby reducing its potential and kinetic energy.

Extending upwardly from each float is a leg 3 having an elongated actuator arm 4 pivotally attached to the top end thereof. Proximal an end of the actuator arm opposite the leg is a fulcrum 5 on which the actuator arm freely pivots upwardly and downwardly as the float moves upwardly and downwardly pursuant to waves passing underneath. Pivotally attached to a distal end of the actuator arm is an oil piston 6 received within a piston chamber 7 that is in fluid communication with an oil reservoir 8. A discharge line 11 extends from the piston chamber to a three-way valve 10, while a bypass line 13 extends from the valve 10 to the oil reservoir.

The three-way valve directs oil to either an oil supply header 12 or the oil reservoir depending on the oil pressure within the oil supply header.

Figures 3, 5:
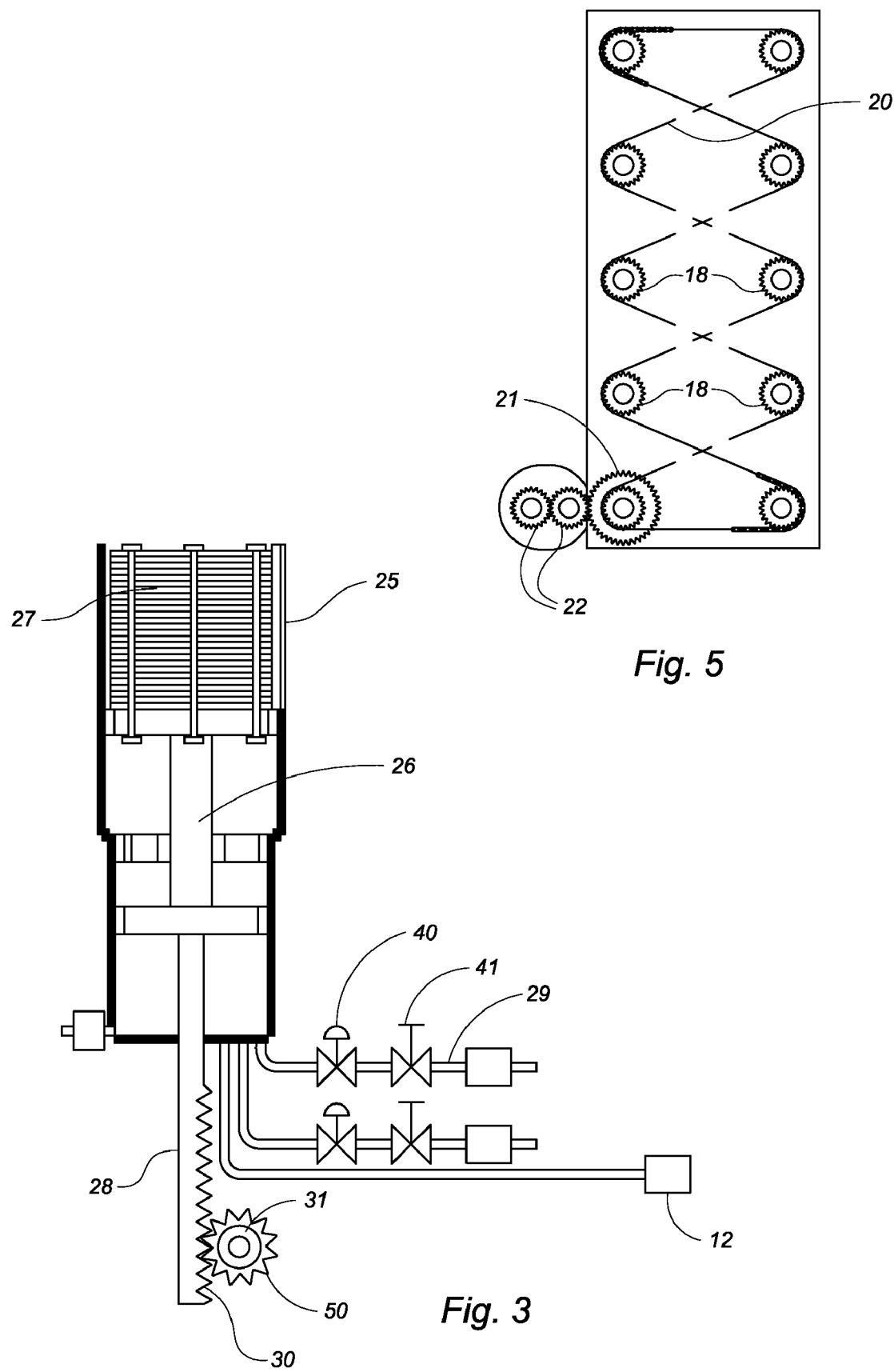
FIG. 3 is an isolated, cross-sectional view of a cylinder.
FIG. 5 is a lower plan view of the movable platform.
Figure 4:
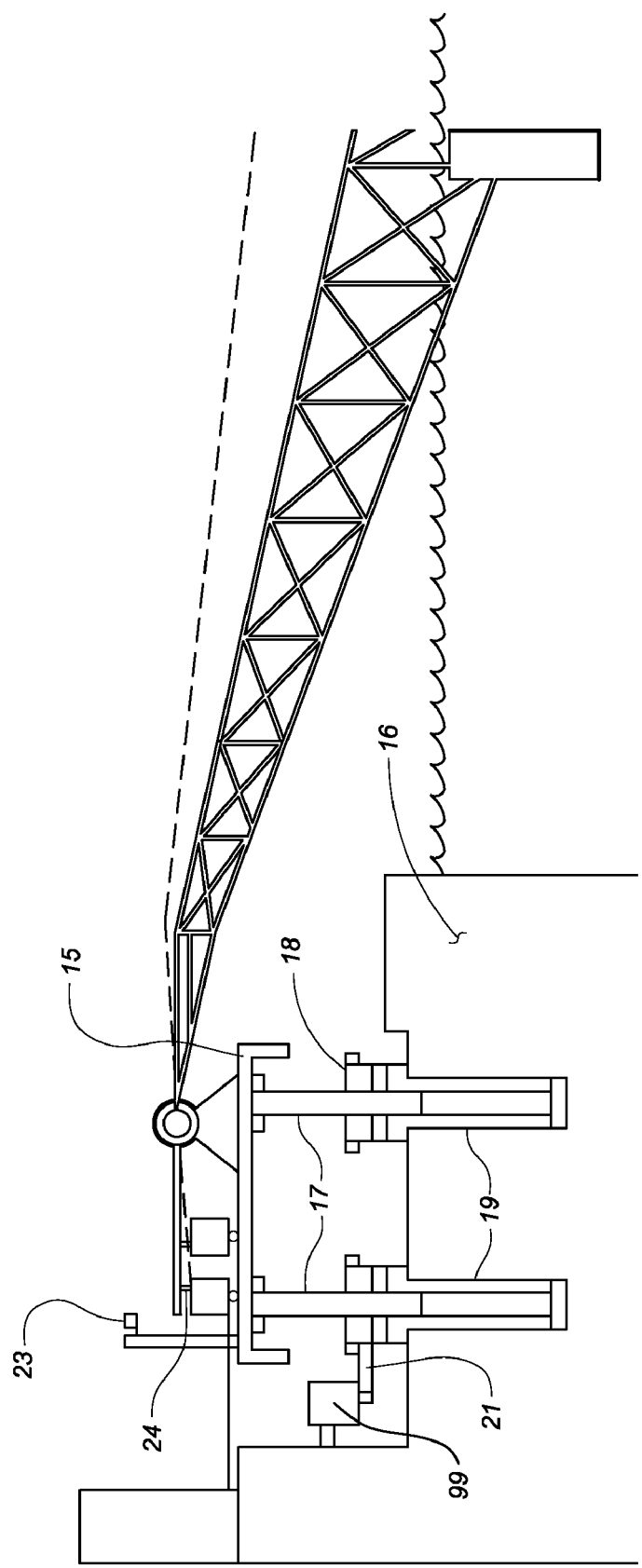
FIG. 4 depicts the movable platform.
Figure 6:
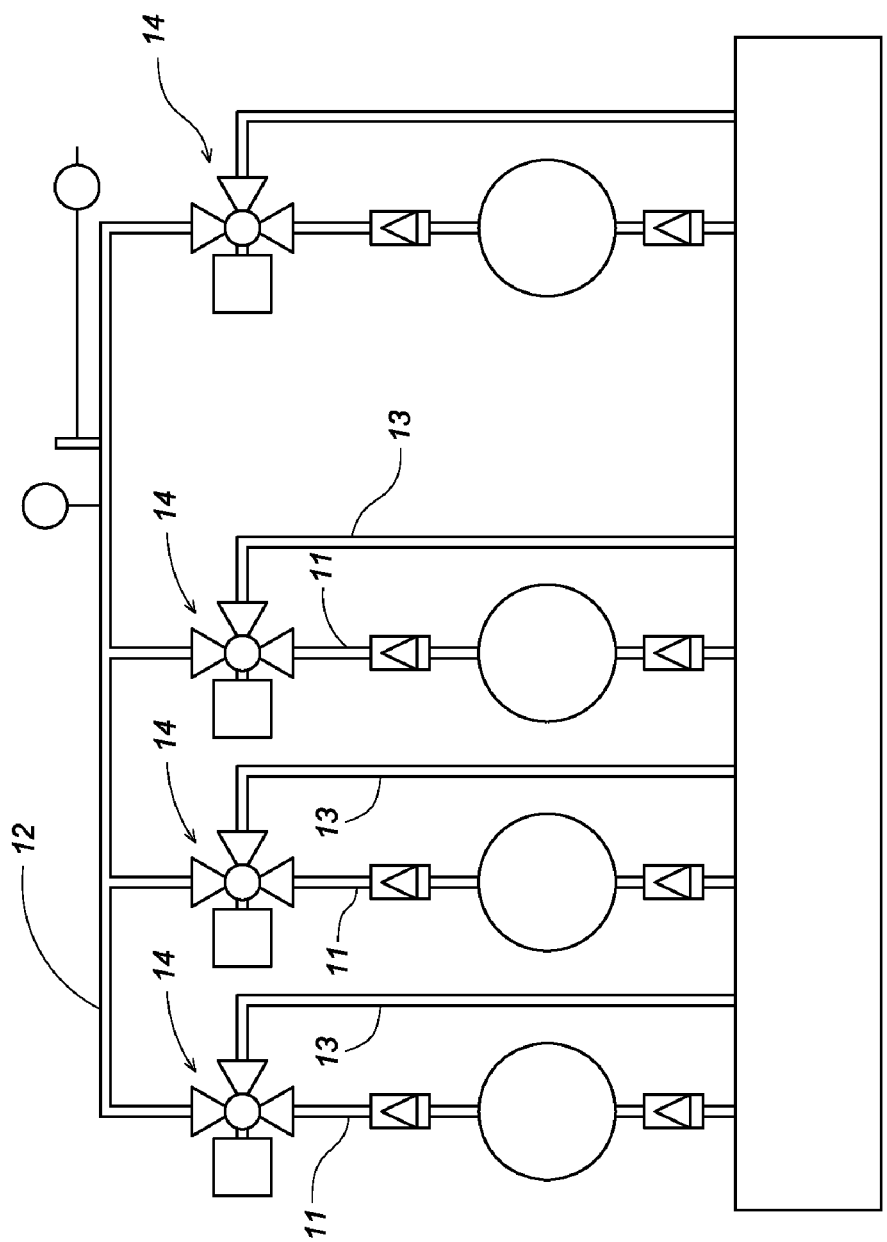
FIG. 6 depicts a typical array of oil pistons and associated piston chambers.
Figure 7:
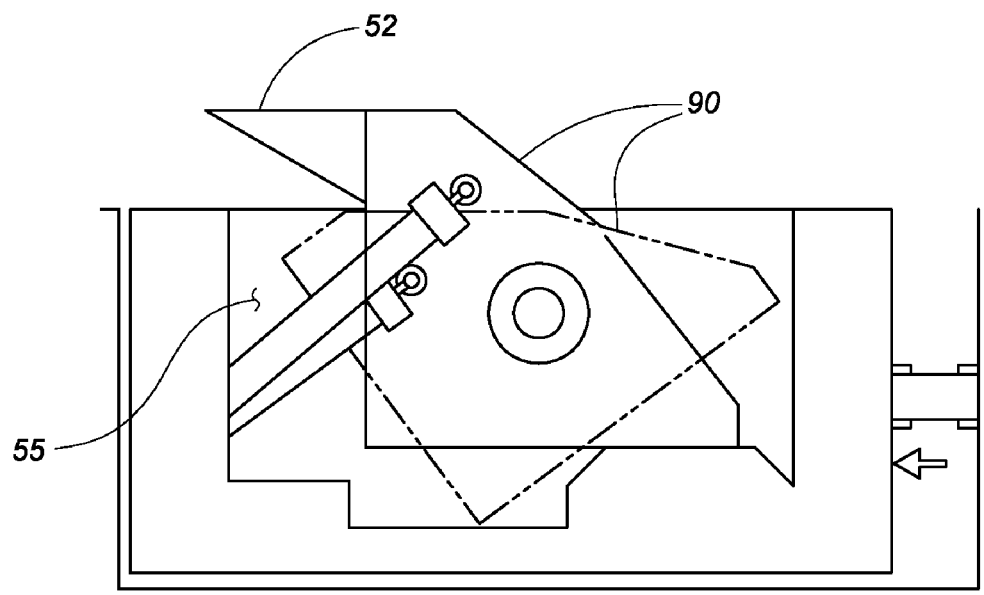
FIG. 7 depicts a spring-biased gear tooth on the pinion engaging a gear tooth on the coupling wheel.
Figure 8:
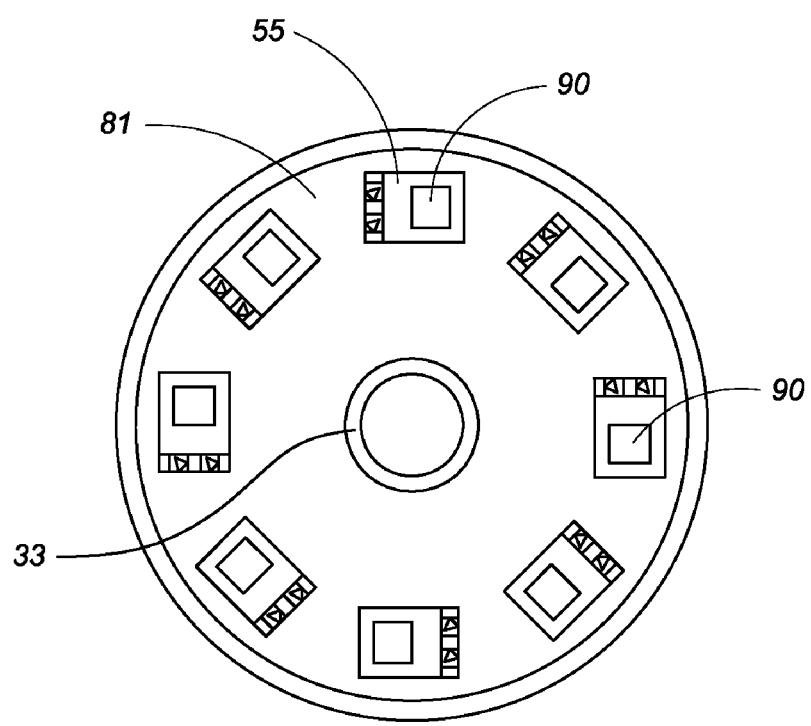
FIG. 8 is a plan view of the pinion depicting the spring-biased gear teeth.

Now referring to FIGS. 4 and 5, the piston chambers and fulcrum are mounted on a movable platform 15 superimposed on a concrete foundation 16. The platform is raised and lowered according to the water level to assure that the actuator arm is sufficiently reciprocated even during periods of low tide. The platform is superimposed on a plurality of screw pilings 17 each of which includes a chain gear 18 mounted on an intermediate portion thereof. Each screw piling is received within a cooperating channel 19 imbedded within the foundation. A single, continuous drive chain 20 encompasses each chain gear so that all screw pilings and associated gears rotate in unison. One of the chain gears 21 is a drive gear and engages a motor-driven 99 gear assembly 22. Upper 23 and lower 24 optical sensors control the operation of the motor by sensing the relative position of the actuator arm and adjusting the motor accordingly. A pilot float and pilot platform are used to adjust all other platforms within a given array or cluster. As such, the pilot platform preferably contains no oil pistons or piston chamber and merely dictates the level of all "pumping" platforms. A conventional controller is in communication with both the motor and the upper and lower sensors. The controller is preprogrammed with a predetermined set point that dictates the operation of the pump. Preferably, each floater is initially installed at an elevation corresponding to the median between the water's high tide and low tide. The average oscillatory position of the actuator arm during operation at the median tide position is the set point. As the tide rises and ebbs, the sensors and controller calculate an average position of the actuator arm and compare the calculated average with the set point. Whenever the calculated average position of the arm deviates from the set point, the motor and associated gear assembly are actuated accordingly to either raise or lower the platform.

Figure 1:
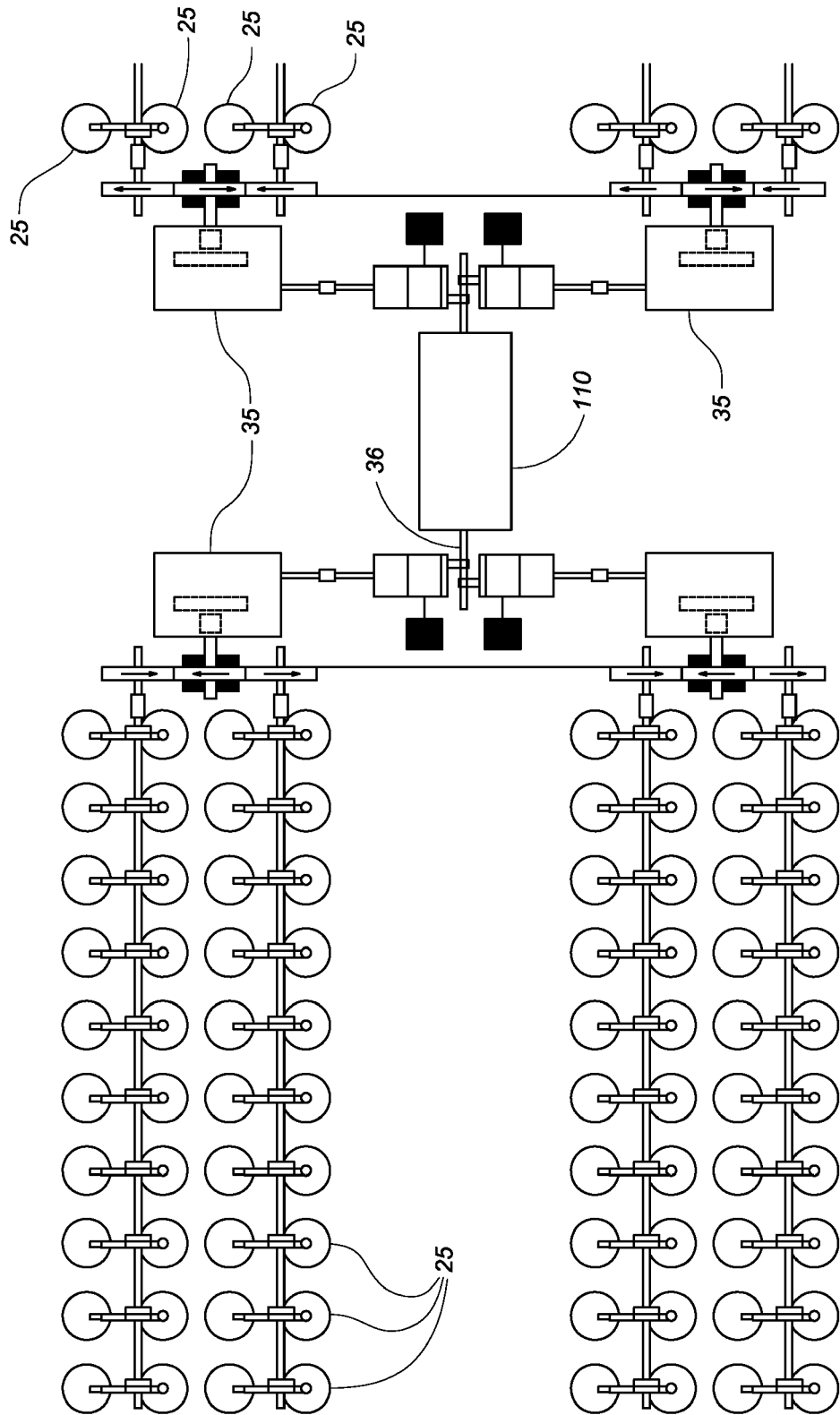
FIG. 1 is a general schematic of the overall power generation system according to the present invention.
Figure 2:
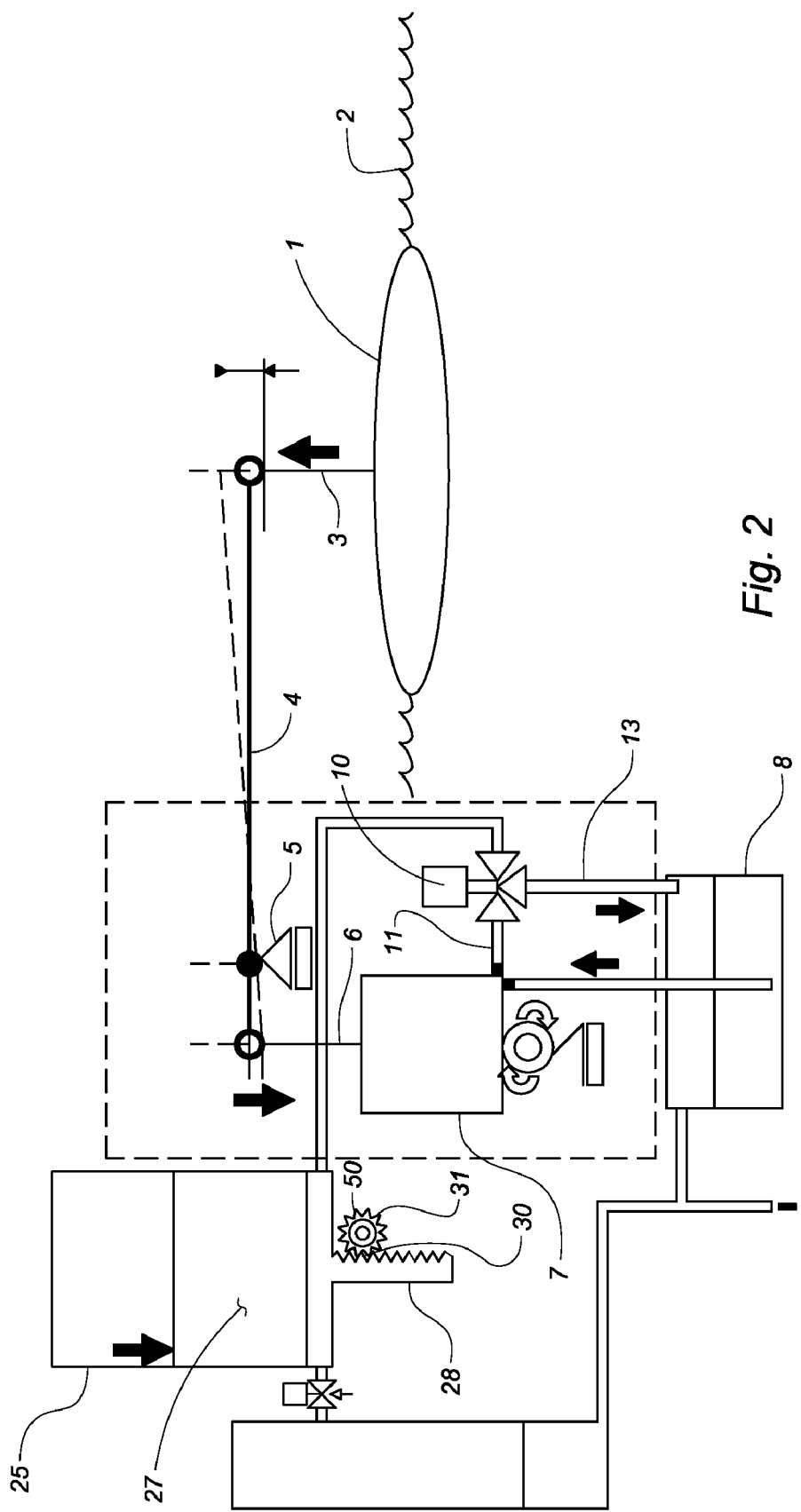
FIG. 2 is an isolated view of a typical float, oil piston, oil chamber and cylinder.

Now referring to FIGS. 1-3, the oil supply header is in fluid communication with one or more of a plurality of load cylinders 25. Each load cylinder includes a plunger 26 received therein with a weighted member 27 resting on an upper end. The plunger includes a geared rack 28 that depends from its lower end and which protrudes from the lower end of the cylinder. Pressurized oil from the supply header is diverted to a lower end of the cylinder. Accordingly, as the pressurized oil enters the cylinder, the plunger and the weighted member are lifted. At the lower end of the cylinder is one or more oil outlets 29 each possibly having a control valve 40 and a shutoff valve 41 thereon. The control valve can be used to vary the downward speed of the weighted member if necessary as explained in more detail, infra.

Now referring to FIG. 2, the rack includes gear teeth 30 that engage a geared periphery 50 on a pinion 31; the pinion also includes teeth 90 pivotally secured on a lateral face 81 which are spring-biased to a deployed orientation; the pivotal teeth selectively engage cogs 52 on a coupling wheel 32 mounted about a common shaft 33. The spring-biased teeth either deploy for engagement with the coupling wheel cogs or retract within depressions 55 formed on the face. If the rotational speed of the pinion is less than that of the coupling wheel, the teeth are pushed into their corresponding depressions. As the pinion speed surpasses that of the coupling wheel shaft, the pinion teeth are automatically deployed to engage cogs on the coupling wheel thereby rotating the common shaft. Each common shaft is interrelated with a generator drive train 35 that is operatively connected to a generator 110 drive shaft 36. Accordingly, rotation of the common shaft drives the generator.

Figure 11:
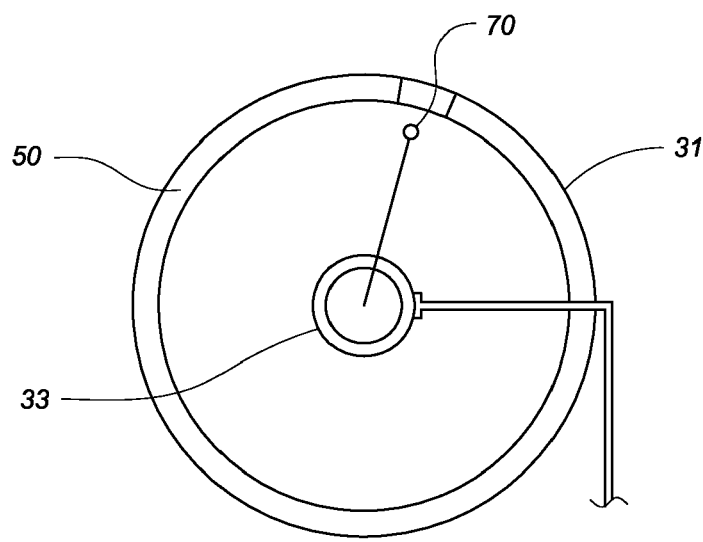
FIG. 11 is a plan view of the pinion depicting the laser emitter.
Figure 12:
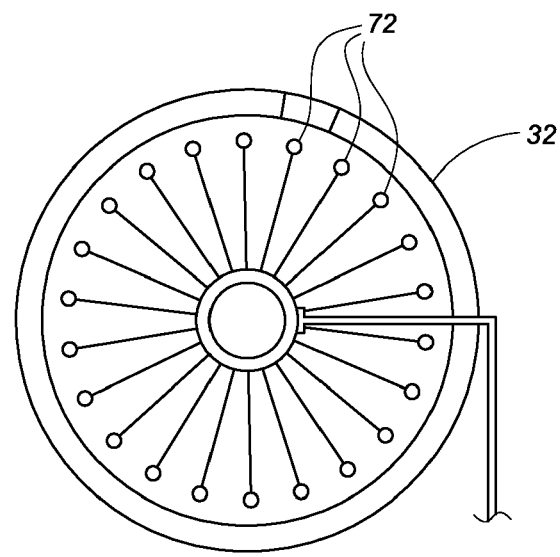
FIG. 12 is a plan view of the coupling wheel depicting the positioning of the peripheral photosensors.

Now referring to FIGS. 11 and 12, the pinion includes a laser beam emitter 70 on its inwardly facing surface for communicating with anyone of a plurality of photosensors 72 peripherally positioned on the adjacent surface of the coupling wheel. The sensors on the coupling wheel are each immediately positioned adjacent one of the coupling wheel teeth so that when the laser beam emitter on the pinion aligns with one of the coupling wheel sensors, the pinion teeth and coupling wheel teeth are almost engaged. When the laser emitter actuates the coupling wheel sensor, a signal is sent to a controller that begins the rapid release of oil from one or more load cylinders. Accordingly, the sensors eliminate the dead time, and thus the energy loss, that results if pinion rotation is initiated when the respective teeth of the pinion and coupling wheel are significantly spaced.

Figure 13:
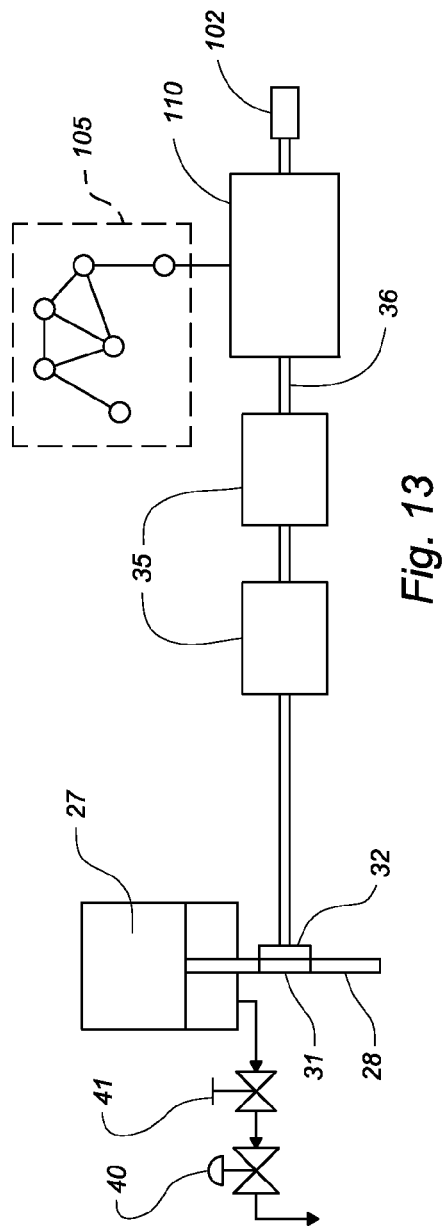
FIG. 13 is a simple schematic of the system operating a generator supplying a large grid.
Figure 14:
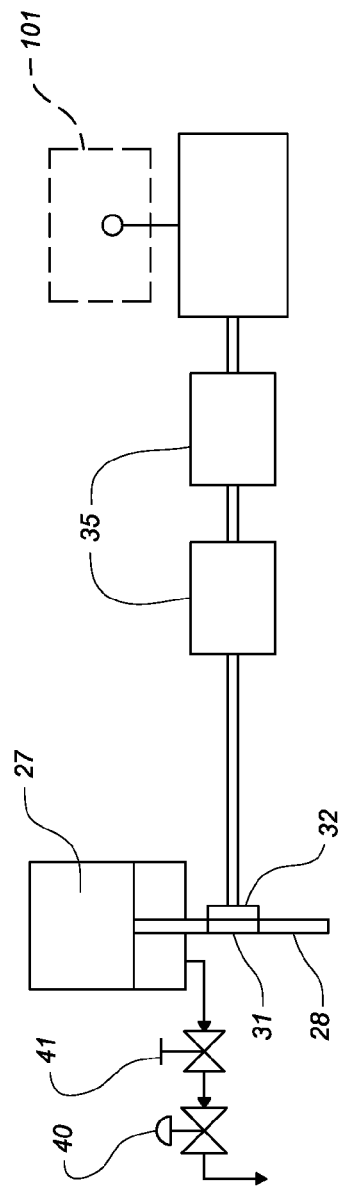
FIG. 14 is a simple schematic of the system operating a generator supplying a small, local grid.

Now referring to FIGS. 13 and 14, the release of oil may be controlled depending upon the application. When the generator is operating a huge grid 105, a startup motor 102 is typically required to operate the generator at a desired nominal speed prior to engagement by the common shaft. The force applied by the weighted member is counteracted by the resulting electromagnetic load reaction of the generator. Accordingly, speed control of the weighted member and plunger is unnecessary. However, a controller will immediately close the shutoff valve in the event of an emergency.

When the generator is operating a small local grid 101, a startup motor may not be unavailable or unnecessary. If the stationary gear trains 35 are engaged when the piston is falling at full speed, the initial momentum is too large. Accordingly, a controller will adjust the control and shutoff valves according to the desired speed of rotation of the gear trains. Initially, the oil pressure at the point of discharge is very high because there is no electromagnetic generator reaction during the ramping of the generator speed. When the weighted member is engaged, the oil pressure decreases rapidly because the gear trains are stationary which balance or offset the gravitational force of the weighted member. As the gear trains begin to move, the oil pressure begins to increase which is the moment that automated control is implemented. When the weighted member is engaged, the controller opens the control valve slightly; as the speed of the gear trains approaches a desired value, and the acceleration of the weighted member becomes zero, the controller adjusts the control valve accordingly. Once the grid is operational, as with the large grid operation described above, the resulting energy produced by the grid controls the descending speed of the plunger and the acceleration of the weighted member.

As will be readily apparent to those skilled in the art, though a single system has been described and depicted, multiple floats and associated piston chambers, pinions, etc., will be necessary to achieve a sufficient amount of electrical generation. Therefore, a predetermined number of plungers can be prepared for release as other plungers are being lifted to assure continuous operation. To assist in this operation, stress detectors are preferably mounted on each fulcrum to measure the relative energy generated by the waves. The measured stress is fed to a controller which activates or deactivates a predetermined number of oil pistons and cylinders accordingly. This control scheme is imperative since larger wave action will generate far more energy than smaller waves so that cylinders can be activated or deactivated as the wave action dictates.

The above described electrical power generation system produces electrical power as follows. Sea waves continuously reciprocate the floats causing the actuator arms to pump oil from the reservoir to the oil supply header. The oil supply headers provide the cylinders with pressurized oil to lift the weighted members to a predetermined height. Rapid release of the oil results in the weighted members descending rapidly thereby driving the pinions and thus the coupling wheel and common shaft. Rotation of the common shaft drives the electrical generator thereby producing electricity.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An electrical power generation system comprising:
   at least one float resting on a surface of a body of water;
   an elongated, reciprocal actuator arm operably connected to said float, said arm reciprocating as waves pass beneath said float;
   a piston pivotally attached to a distal end of said actuator arm;
   a piston chamber receiving said piston, said chamber in communication with a fluid source;
   a cylinder in fluid communication with said piston chamber, said piston pumping fluid from said fluid source to said cylinder as said arm is reciprocated;
   a weighted member received within said cylinder, said weighted member superimposed on a plunger, said weighted member lifted by fluid delivered from said piston chamber;
   a drive means engaging said plunger for driving a generator as said weighted member descends rapidly to generate electricity, wherein said drive means includes a geared rack depending from said plunger and protruding from said cylinder, a pinion engaging said geared rack, a coupling wheel selectively engaging said pinion, said coupling wheel mounted about a common shaft, and a drive train interconnecting said coupling wheel and a generator.

2. The system according to claim 1 wherein said float includes an inwardly-tapered end that faces oncoming waves to maximize energy transfer efficiency from the waves to the float.

3. The system according to claim 1 further comprising means for releasing said plunger after said plunger has been lifted by fluid delivered from said piston chamber.

4. The system according to claim 3 wherein said means for releasing said plunger after said plunger has been lifted comprises a valve for rapidly releasing fluid from said cylinder after said weighted member has been lifted.

5. The system according to claim 4 wherein said pinion includes a plurality of teeth, each of said teeth pivotally secured within a depression formed on a lateral face of said pinion, said teeth spring-biased to a deployed orientation, said teeth selectively engaging cogs on said coupling wheel whereby said teeth are pushed into said depressions if a rotational speed of the pinion is less than a rotational speed of said coupling wheel and whereby said teeth are automatically deployed to engage said cogs as the rotational speed of said pinion surpasses the rotational speed of said coupling wheel.

6. The system according to claim 5 further comprising:
   a laser-beam emitter on said pinion;
   a plurality of photosensors peripherally positioned on said coupling wheel, said photosensors each immediately positioned adjacent one of said cogs so that when the laser beam emitter aligns with one of said photosensors, said teeth and said cogs are proximally engaged;
   a control means in communication with said photosensors and said valve for automatically opening said valve when said laser beam emitter is aligned with one of said photosensors to release fluid from said cylinder thereby eliminating any resulting dead time and energy loss that occurs if rotation of said pinion is initiated when said teeth and said cogs are significantly spaced.

7. The system according to claim 1 further comprising a means for controlling a downward acceleration of said plunger.

8. The system according to claim 1 wherein said piston chamber is mounted on a movable platform for varying a height of said piston chamber and said actuator arm according to tidal changes of said body of water.

9. The system according to claim 8 further comprising means for automatically raising and lowering said platform according to a current level of said body of water.

10. The system according to claim 9 wherein said means for automatically raising and lowering said platform according to a current level of said body of water comprises:
    a plurality of screw pilings positioned beneath said platform, said screw pilings each received with a channel;
    a gear mounted on each screw piling;
    a drive chain encompassing each of said gears whereby movement of said chain causes all of said screw pilings to rotate in unison;
    a motor means for driving said chain in either of two directions to extend and retract said pilings;
    a sensing means in communication with said motor means for determining a height of a distal end of said actuating arm whereby said motor means raises and lowers said platform according to the height of the distal end of said actuating arm as determined by said sensing means.

11. An electrical power generation system comprising:
    at least one float resting on a surface of a body of water;
    an elongated, reciprocal actuator arm operably connected to said float, said arm reciprocating as waves pass beneath said float;
    a piston pivotally attached to a distal end of said actuator arm;
    a piston chamber receiving said piston, said chamber in communication with a fluid source, said piston chamber mounted on a movable platform for varying a height of said piston chamber and said actuator arm according to tidal changes of said body of water;
    a cylinder in fluid communication with said piston chamber, said piston pumping fluid from said fluid source to said cylinder as said arm is reciprocated;
    a weighted member received within said cylinder, said weighted member superimposed on a plunger, said weighted member lifted by fluid delivered from said piston chamber;
    a drive means engaging said plunger for driving a generator as said weighted member descends rapidly to generate electricity.

12. The system according to claim 11 wherein said float includes an inwardly-tapered end that faces oncoming waves to maximize energy transfer efficiency from the waves to the float.

13. The system according to claim 11 wherein said drive means comprises:
    a geared rack depending from said plunger and protruding from said cylinder;
    a pinion engaging said geared rack;

a coupling wheel selectively engaging said pinion, said coupling wheel mounted about a common shaft;

a drive train interconnecting said coupling wheel and a generator.

14. The system according to claim 11 further comprising means for releasing said plunger after said plunger has been lifted by fluid delivered from said piston chamber.

15. The system according to claim 14 wherein said means for releasing said plunger after said plunger has been lifted comprises a valve for rapidly releasing fluid from said cylinder after said weighted member has been lifted.

16. The system according to claim 15 wherein said pinion includes a plurality of teeth, each of said teeth pivotally secured within a depression formed on a lateral face of said pinion, said teeth spring-biased to a deployed orientation, said teeth selectively engaging cogs on said coupling wheel whereby said teeth are pushed into said depressions if a rotational speed of the pinion is less than a rotational speed of said coupling wheel and whereby said teeth are automatically deployed to engage said cogs as the rotational speed of said pinion surpasses the rotational speed of said coupling wheel.

17. The system according to claim 16 further comprising:
a laser-beam emitter on said pinion;
a plurality of photosensors peripherally positioned on said coupling wheel, said photosensors each immediately positioned adjacent one of said cogs so that when the laser beam emitter aligns with one of said photosensors, said teeth and said cogs are proximally engaged;
a control means in communication with said photosensors and said valve for automatically opening said valve when said laser-beam emitter is aligned with one of said photosensors to release fluid from said cylinder thereby eliminating any resulting dead time and energy loss that occurs if rotation of said pinion is initiated when said teeth and said cogs are significantly spaced.

18. The system according to claim 11 further comprising a means for controlling a downward acceleration of said plunger.

19. The system according to claim 11 further comprising means for automatically raising and lowering said platform according to a current level of said body of water.

20. The system according to claim 19 wherein said means for automatically raising and lowering said platform according to a current level of said body of water comprises:
a plurality of screw pilings positioned beneath said platform, said screw pilings each received with a channel;
a gear mounted on each screw piling;
a drive chain encompassing each of said gears whereby movement of said chain causes all of said screw pilings to rotate in unison;
a motor means for driving said chain in either of two directions to extend and retract said pilings;
a sensing means in communication with said motor means for determining a height of a distal end of said actuating arm whereby said motor means raises and lowers said platform according to the height of the distal end of said actuating arm as determined by said sensing means.

21. An electrical power generation system comprising:
at least one float resting on a surface of a body of water;
an elongated, reciprocal actuator arm operably connected to said float, said arm reciprocating as waves pass beneath said float;
a piston pivotally attached to a distal end of said actuator arm;
a piston chamber receiving said piston, said chamber in communication with a fluid source;
a cylinder in fluid communication with said piston chamber, said piston pumping fluid from said fluid source to said cylinder as said arm is reciprocated;
a weighted member received within said cylinder, said weighted member superimposed on a plunger, said weighted member lifted by fluid delivered from said piston chamber;
a drive means engaging said plunger for driving a generator as said weighted member descends rapidly to generate electricity, wherein said drive means includes a geared rack depending from said plunger and protruding from said cylinder, a pinion engaging said geared rack, a coupling wheel selectively engaging said pinion, said coupling wheel mounted about a common shaft, and a drive train interconnecting said coupling wheel and a generator;
wherein said pinion includes a plurality of teeth, each of said teeth pivotally secured within a depression formed on a lateral face of said pinion, said teeth spring-biased to a deployed orientation, said teeth selectively engaging cogs on said coupling wheel whereby said teeth are pushed into said depressions if a rotational speed of the pinion is less than a rotational speed of said coupling wheel and whereby said teeth are automatically deployed to engage said cogs as the rotational speed of said pinion surpasses the rotational speed of said coupling wheel;
means for releasing said plunger after said plunger has been lifted by fluid delivered from said fluid piston wherein said means for releasing said plunger includes a valve for rapidly releasing fluid from said cylinder after said weighted member has been lifted.

22. The system according to claim 21 wherein said float includes an inwardly-tapered end that faces oncoming waves to maximize the energy transfer efficiency from the waves to the float.

23. The system according to claim 21 further comprising:
a laser-beam emitter on said pinion;
a plurality of photosensors peripherally positioned on said coupling wheel, said photosensors each immediately positioned adjacent one of said cogs so that when the laser-beam emitter aligns with one of said photosensors, said teeth and said cogs are proximally engaged;
a control means in communication with said photosensors and said valve for automatically opening said valve when said laser beam emitter is aligned with one of said photosensors to release fluid from said cylinder thereby eliminating any resulting dead time and energy loss that occurs if rotation of said pinion is initiated when said teeth and said cogs are significantly spaced.

24. The system according to claim 21 further comprising a means for controlling a downward acceleration of said plunger.

25. The system according to claim 21 wherein said piston chamber is mounted on a movable platform for varying a height of said piston chamber and said actuator arm according to tidal changes of said body of water.

26. The system according to claim 25 further comprising means for automatically raising and lowering said platform according to a current level of said body of water.

27. The system according to claim 26 wherein said means for automatically raising and lowering said platform according to a current level of said body of water comprises:
- a plurality of screw pilings positioned beneath said platform, said screw pilings each received with a channel;
- a gear mounted on each screw piling;
- a drive chain encompassing each of said gears whereby movement of said chain causes all of said screw pilings to rotate in unison;
- a motor means for driving said chain in either of two directions to extend and retract said pilings;
- a sensing means in communication with said motor means for determining a height of a distal end of said actuating arm whereby said motor means raises and lowers said platform according the height of the distal end of said actuating arm as determined by said sensing means.

* * * * *